US012789137B2

(12) United States Patent
Hsu

(10) Patent No.: US 12,789,137 B2
(45) Date of Patent: Nov. 10, 2026

(54) SPLIT REDUCIBLE DEHUMIDIFIER

(71) Applicant: DRYTECH CORPORATION LTD., Tainan City (TW)

(72) Inventor: Tsang-Hung Hsu, Tainan City (TW)

(73) Assignee: Drytech Corporation Ltd., Tainan City (TW)

( * ) Notice: Subject to any disclaimer, the term of this patent is extended or adjusted under 35 U.S.C. 154(b) by 320 days.

(21) Appl. No.: 18/433,875

(22) Filed: Feb. 6, 2024

(65) Prior Publication Data

US 2025/0249396 A1 Aug. 7, 2025

(51) Int. Cl.
*B01D 53/02* (2006.01)
*B01D 53/04* (2006.01)
*B01D 53/26* (2006.01)

(52) U.S. Cl.
CPC ....... *B01D 53/261* (2013.01); *B01D 53/0415* (2013.01); *B01D 2253/34* (2013.01); *B01D 2257/80* (2013.01); *B01D 2258/06* (2013.01)

(58) Field of Classification Search
CPC ............ B01D 2253/34; B01D 2257/80; B01D 2258/06; B01D 53/0415; B01D 53/261
See application file for complete search history.

(56) References Cited

U.S. PATENT DOCUMENTS 4,654,057 A * 3/1987 Rhodes ................ B01D 53/261 96/127
5,230,719 A * 7/1993 Berner .................. F24F 12/001 165/4
5,673,493 A 10/1997 Kazakis et al.
5,817,167 A * 10/1998 DesChamps ........... B01D 53/06 95/114
6,364,937 B1 * 4/2002 McMahon ........... B01D 53/261 96/132
6,675,492 B2 1/2004 Hsu
9,562,699 B2 2/2017 Wang

FOREIGN PATENT DOCUMENTS

CN 2444170 Y 8/2001
CN 208794586 U 4/2019
JP 2012239998 A 12/2012

* cited by examiner

*Primary Examiner* — Christopher P Jones
(74) *Attorney, Agent, or Firm* — Rosenberg, Klein & Lee

(57) ABSTRACT

The present invention relates to a split reducible dehumidifier, which includes a hot air supply unit and a hygroscopic ingot that is movably coupled to the air outlet of the hot air supply unit in a detachable manner to perform moisture absorption reduction treatment. The hygroscopic ingot includes a hygroscopic ingot body. The hygroscopic ingot is made by pressing and solidifying porous hygroscopic materials into an ingot-shaped structure with hygroscopic efficiency. The dehumidifier is constructed so as not to require a shell to accommodate the hygroscopic materials. The hygroscopic materials are formed into channels evenly distributed in the deep interior of the hygroscopic ingot body, forming ventilation paths that do not require the installation of air ducts, so that the hot air generated by the hot air supply unit flows through multiple channels, and is evenly distributed to all corners of the inside of the hygroscopic ingot body.

15 Claims, 3 Drawing Sheets

SPLIT REDUCIBLE DEHUMIDIFIER

BACKGROUND OF THE PRESENT INVENTION

Field of Invention

The present invention relates to the field of dehumidification, and in particular, to a split reducible dehumidifier that uses a hygroscopic ingot as the main body, which can be coupled to a hot air supply unit to perform moisture absorption efficiency reduction treatment, or is separated from the hot air supply unit to independently carry out moisture absorption, and does not need to be equipped with a shell to accommodate hygroscopic materials.

Description of Related Arts

According to the principle of a dehumidifier using porous hygroscopic materials as raw materials, when the hygroscopic material absorbs moisture from the environment, the hygroscopic material can be restored to dryness by heating the hygroscopic material and providing moisture absorption function again.

For example, U.S. Pat. Nos. 5,673,493, 6,675,492, CN 2444170Y, CN208794586, JP 2012239998, etc. all use the above-mentioned technology to make hygroscopic materials reusable.

However, in the above-mentioned previous patents, the hygroscopic materials are conventionally composed of many loose particles, and in order to assemble many free-rolling granular hygroscopic materials, the structure must accommodate these large numbers of granular hygroscopic materials in a single shell, which is usually made of plastic or metal.

Such a structure produces the following shortcomings in actual use:

1. The producer must additionally develop the shell that accommodates these many granular hygroscopic materials, which not only costs the material and manufacturing cost of the shell, but also takes time to encapsulate the many granular hygroscopic materials in the shell to avoid falling out of the shell, resulting in the complexity of the assembly procedure and the increase of production costs.
2. The granular hygroscopic materials covered inside the shell are blocked by the shell, which reduces the direct contact area between the hygroscopic materials and the humid air outside the shell, thus reducing the hygroscopic efficiency of the hygroscopic materials.
3. When the product is discarded, in addition to increasing the amount of waste from the shell, the shell must be disassembled for waste sorting during recycling, which is quite inconvenient.
4. The contact area between many loose granular hygroscopic materials is small, so the heat energy transfer during the drying and reduction process is slow, that is, more time is needed to complete the drying and reduction, which is not only time-consuming but also energy-consuming.
5. When reducing the hygroscopic material in the shell, the heat energy required to deliver the hygroscopic material is unevenly distributed, resulting in poor reduction of the hygroscopic material in the corners of the shell.

In the other U.S. Pat. No. 9,562,699 B2, although the hygroscopic material is reduced by hot air as in the present application, it still adopts the traditional method of placing granular hygroscopic materials inside a shell, similar to the aforementioned patented technologies. Therefore, in the U.S. Pat. No. 9,562,699 B2, when the hygroscopic materials in the shell are to be dried and restored, the shell is combined with a fan unit, so that the hot air generated by the fan unit passes through the air duct built in the center of the shell, and then passes through the perforations in the air duct to deliver the hot air required for drying and restoration of the hygroscopic materials in the shell. However, in order to prevent the hygroscopic material particles from falling out of the air duct, the diameter of the perforations must be smaller than the diameter of the hygroscopic material particles. As a result, the tiny perforations on the air duct becomes an obstacle to the hot air conveying path, causing the amount of hot air received by the hygroscopic material to decrease. Additionally, due to the installation of the air duct, the hygroscopic materials are shielded by the wall surface of the air duct, which reduces the heating area to be reduced. Furthermore, because of the setting of the air duct, the occupation of the volume of the air duct is formed, the space in the shell is reduced, and the capacity of the hygroscopic materials is reduced. In addition, the U.S. Pat. No. 9,562,699 B2, like many previous patents mentioned above, also has the above-mentioned five shortcomings.

Therefore, the inventor developed the present invention in view of the shortcomings of the previously above-mentioned solutions in terms of implementation, such as low reduction effectiveness, a large shell volume, a small hygroscopic material capacity, complicated assembly procedures, increased production costs, and inconvenient recycling.

SUMMARY OF THE PRESENT INVENTION

The object of the present invention is to provide a detachable reducible dehumidifier, which is to press and solidify the porous hygroscopic material used to form a cylindrical or block-shaped hygroscopic ingot, so that the hygroscopic ingot can be packaged without using a shell, can directly correspond and be coupled to the air outlet of the hot air supply unit for drying and reduction, and constitutes a shell-less dehumidifier that does not require the shell to accommodate hygroscopic materials.

Another object of the present invention is to make the hygroscopic materials integrally formed a plurality of channels distributed in the corners of the inside of the hygroscopic ingot body, formed a plurality of ventilation paths that do not need to be provided with air ducts, and then make the deep interior of the hygroscopic materials obtain a larger contact surface with the outside moist air and improve the hygroscopic efficiency. In addition, the hot air generated by the hot air supply unit is evenly distributed through multiple channels distributed in the deep interior of the hygroscopic ingot body, and at the same time, the bottleneck of hot airflow is eliminated by eliminating the installation of air ducts, so that the hygroscopic materials can obtain a better heat effect, and the purpose of providing a dehumidifier with better reduction efficiency, strong moisture absorption power, and lower cost is achieved.

The above-mentioned object of the present invention is achieved through the following technologies:

a split reducible dehumidifier includes a hygroscopic ingot and a hot air supply unit, wherein the hygroscopic ingot includes a hygroscopic ingot body, which is the porous hygroscopic material that is ground into powder form as the main component, then cooperates with an adhesive to be pressed by a mold and solidified into an ingot-shaped structure with hygroscopic efficiency by drying, wherein when the porous hygroscopic ingot materials are pressed into the ingot-shaped structure, the hygroscopic material is integrally formed into multiple channels evenly distributed inside the hygroscopic ingot body simultaneously, and forms a plurality of ventilation paths that do not need to be arranged without air ducts, wherein when the hygroscopic ingot adsorbs moisture saturation and loses hygroscopic effect, and it is necessary to dry and reduce to restore the moisture absorption effect, the hygroscopic ingot is coupled to the air outlet of the hot air supply unit, and the hot air generated by the hot air supply unit is evenly delivered to all corners of the inside of the hygroscopic ingot body through multiple channels distributed in the deep interior of the hygroscopic ingot body, wherein when the hygroscopic ingot needs to dehumidify the environment, the hygroscopic ingot can be separated from the hot air supply unit and placed separately in the environment that needs to be dehumidified for dehumidification.

In the above-mentioned split reducible dehumidifier, the hygroscopic ingot body has a rough surface that can increase the hygroscopic surface area and a plurality of channels arranged therein.

In the above-mentioned split reducible dehumidifier, the hygroscopic ingot includes an upper base combined with an upper end of the hygroscopic ingot body, wherein the upper base has at least one exhaust hole arranged thereon.

In the above-mentioned split reducible dehumidifier, the hygroscopic ingot includes a humidity sensing component arranged on the upper base.

In the above-mentioned split reducible dehumidifier, the humidity sensing component is a moisture-absorbing color-changing component.

In the above-mentioned split reducible dehumidifier, the upper base has a chamber disposed therein, and the moisture-absorbing color-changing component is accommodated in the chamber, wherein the chamber has a through hole arranged at a bottom thereof, so that the chamber is communicated with the hygroscopic ingot body through the through hole, wherein the upper base includes a transparent cover covering on the chamber.

In the above-mentioned split reducible dehumidifier, the hygroscopic ingot includes a lower base combined with a lower end of the hygroscopic ingot body, wherein the lower base has an air chamber formed by a concave cavity structure, wherein the lower base has at least one air inlet arranged thereon, the air chamber is communicated with the air inlet.

The advantages of the present invention include:

1. The present invention directly forms a columnar or block-shaped ingot with multiple channels of hygroscopic materials, and can no longer need to encapsulate and cover the shell around the hygroscopic materials, so that the production manufacturing and assembly process can be reduced, and the production cost is reduced.
2. Since the present invention directly shapes the hygroscopic materials into a columnar or block-shaped ingot with a plurality of channels, there is no need to encapsulate them with a shell of plastic or other materials. Therefore, when the product is discarded, the garbage generation can be reduced, or when the resource is recovered, there is no need to do the action of dismantling the shell, and the recycling is convenient.
3. Since the hygroscopic ingot of the present invention does not need to be encapsulated by a shell, the hygroscopic materials are not blocked by the shell and can obtain a complete contact area with the outside air, and then can adsorb moisture more quickly, produce a better moisture absorption effect.
4. Since the hygroscopic ingot of the present invention is a solidified structure formed by high pressure of powdered porous hygroscopic materials, the hygroscopic materials form a relatively tighter connection structure, so it has better heat conductivity, can shorten the time of drying and reduction, and then achieves the effect of energy saving.
5. Since the hygroscopic ingot of the present invention is pressed into an ingot-shaped structure, simultaneously integrally forming multiple channels evenly distributed in the deep interior of the hygroscopic ingot body, constituting plurality of ventilation paths that do not need to be provided with air ducts, so when the hygroscopic ingot absorbs moisture and needs to carry out hygroscopic reduction treatment, the hot air generated by the hot air supply unit can evenly deliver to each corner inside the hygroscopic ingot body through the plural channels and improve the reduction efficiency.
6. Since the present invention utilizes the hygroscopic materials to integrally form into multiple channels distributed evenly throughout the deep interior of the hygroscopic ingot body, multiple ventilation paths are formed that do not require the installation of air ducts. As a result, when delivering hot air, the bottleneck of air passing through the perforations in the air ducts is eliminated, reducing heat energy loss and improving the efficiency of drying.
7. Since the present invention utilizes the hygroscopic materials to integrally form into multiple channels distributed evenly throughout the deep interior of the hygroscopic ingot body, multiple ventilation paths are formed that do not require the installation of air ducts. Therefore, the hygroscopic materials will not be shielded by the wall of the air ducts, which will increase the heating surface area and improve the reduction efficiency.
8. Since the present invention utilizes the hygroscopic materials to integrally form into multiple channels distributed evenly throughout the deep interior of the hygroscopic ingot body, multiple ventilation paths are formed that do not require the installation of air ducts, and reduces the occupation of the volume of air ducts, so that the volume of hygroscopic materials in the hygroscopic ingot is increased, and the moisture absorption capacity is improved.
9. Since the lower end of the hygroscopic ingot body of the present invention is combined with a lower base, the lower base is provided with an air chamber composed of a concave cavity structure. Therefore, before the hot air generated by the hot air supply unit enters the plurality of channels in the hygroscopic ingot body, it passes through the air chamber formed by the cavity in the lower base, and the hot airflow input from the air inlet is first diffused inside the air chamber, thereby allowing each part of the overall cavity to obtain a balanced positive pressure, so that the hot airflow can be divided into equal pressures and equal amounts to each channel in the hygroscopic ingot body, further achieving a uniform drying and reduction effect in every corner of the hygroscopic ingot body.

DETAILED DESCRIPTION OF THE PREFERRED EMBODIMENT

Figure 1:
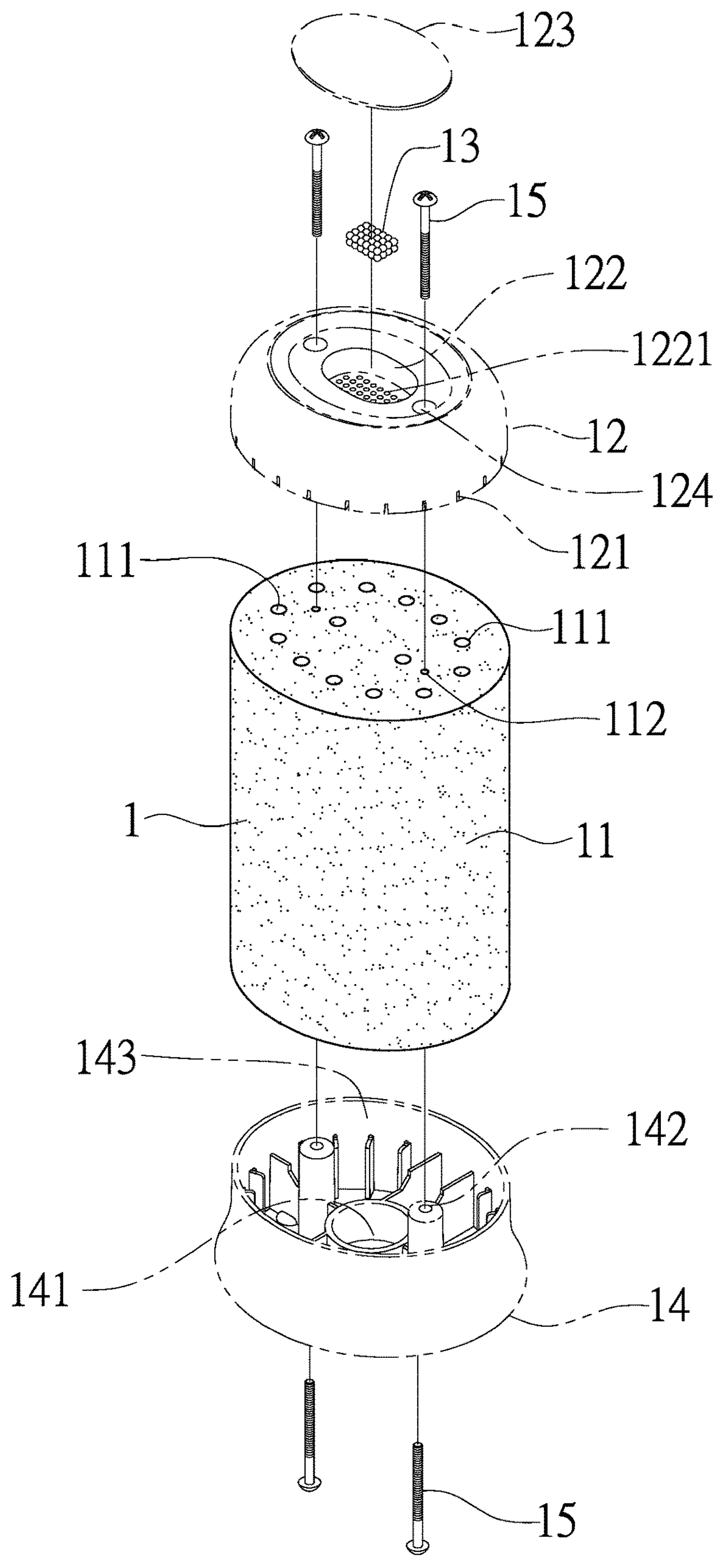
FIG. 1 is an exploded view of a split reducible dehumidifier according to the present invention.
Figure 2:
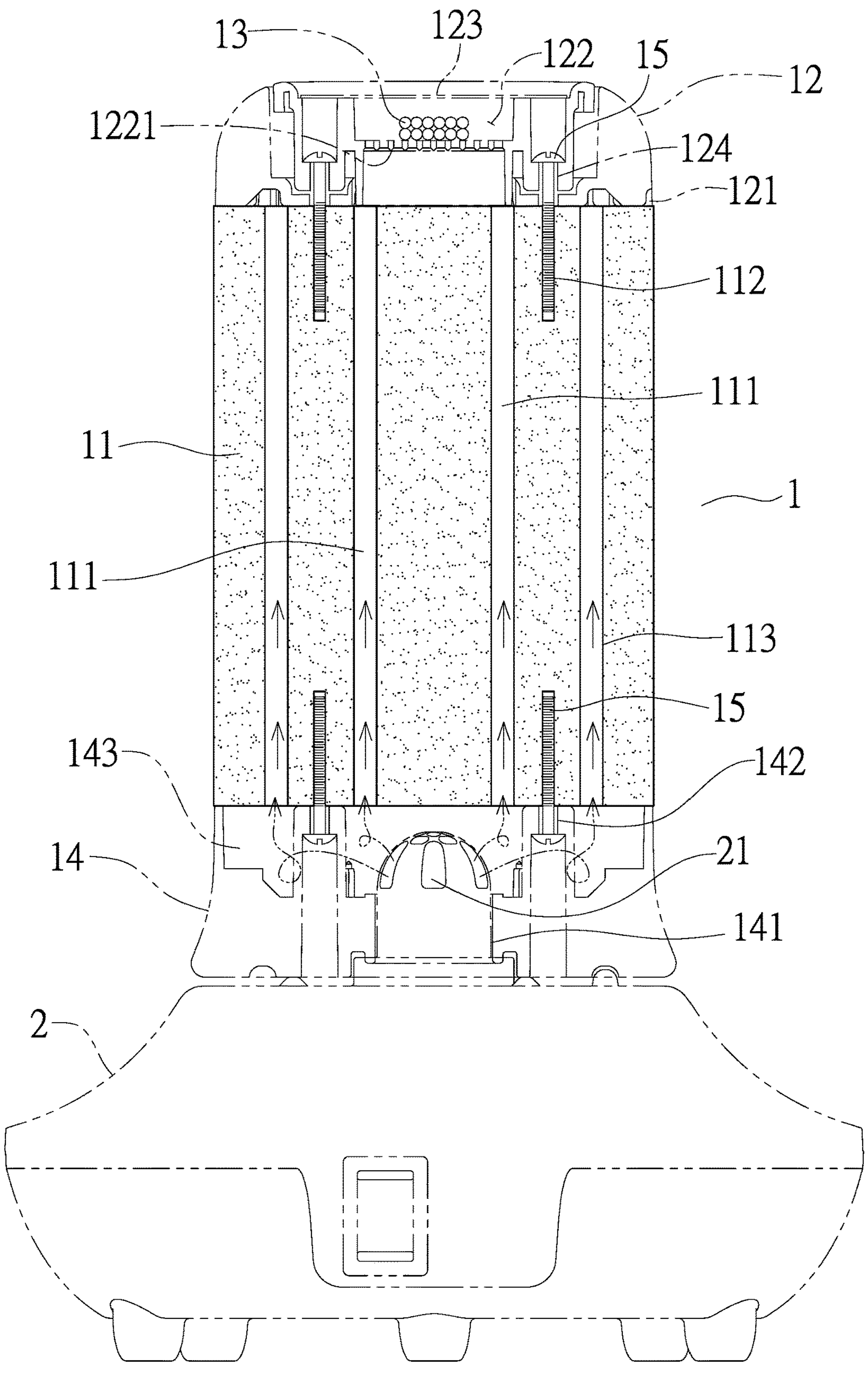
FIG. 2 is a sectional view of the split reducible dehumidifier according to the present invention.
Figure 3:
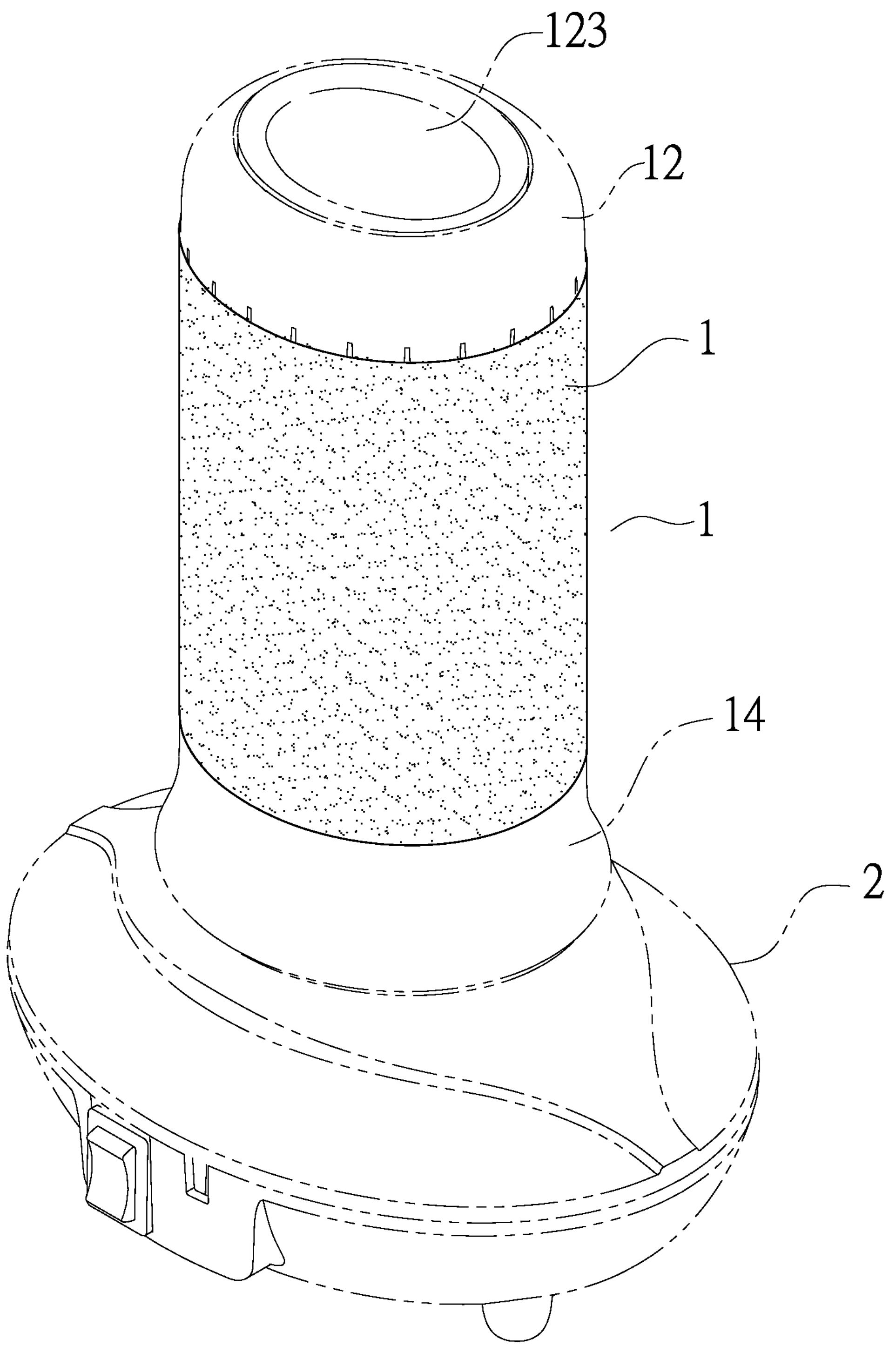
FIG. 3 is an assembled perspective view of the split reducible dehumidifier according to the present invention.

Referring to FIGS. 1-3.

The split reducible dehumidifier of the present invention includes a hygroscopic ingot 1 and a hot air supply unit 2, wherein the hygroscopic ingot 1 includes a hygroscopic ingot body 11, which is a porous hygroscopic material ground into powder as the main component, and then is pressed by a mold and dried to cured into an ingot-shaped structure with hygroscopic efficiency. When the porous hygroscopic material is pressed into an ingot-shaped structure, the hygroscopic ingot body 11 has multiple channels 111 evenly distributed inside the hygroscopic ingot body 11 that are simultaneously formed by the hygroscopic material, to form multiple ventilation paths without air ducts.

In addition, in a preferred embodiment of a split reducible dehumidifier of the present invention, the hygroscopic ingot body 11 has a rough surface, so as to increase the hygroscopic surface area of the hygroscopic ingot body 11 through the rough surface, thereby improving the moisture absorption effect.

In the preferred embodiment of the split reducible dehumidifier of the present invention, the hygroscopic ingot 1 further includes an upper base 12 arranged thereon, the upper base 12 is combined to the upper end of the hygroscopic ingot body 11, wherein the upper base 12 has at least one exhaust hole 121 arranged thereon, the exhaust hole 121 is communicated with the channel 111 of the hygroscopic ingot body 11, so that after the hot airflow enters the hygroscopic ingot body 11, the water vapor evaporated from is discharged by the exhaust hole 121 through the upper base 12.

In a preferred embodiment of a split reducible dehumidifier of the present invention, the hygroscopic ingot 1 further includes a humidity sensing component 13. The humidity sensing component 13 is located on the upper base 12. The humidity sensing component 13 is used to determine the degree of moisture absorption saturation of the hygroscopic ingot body 11. Usually, the humidity sensing component 13 includes a moisture-absorbing color-changing component, which is a moisture-sensitive color-changing material that changes color as the degree of moisture absorption of the hygroscopic ingot body 11 increases, allowing the user to directly identify the color change of the moisture-sensitive color-changing material and determine whether the hygroscopic ingot body 11 needs to be dried and restored.

In a preferred embodiment of a split reducible dehumidifier of the present invention, the upper base 12 has a chamber 122, and the humidity sensing component 13 is accommodated in the chamber 122. The chamber 122 has at least one through hole 1221 at a bottom thereof, so that the chamber 122 communicates with the hygroscopic ingot body 11 through the through hole 1221. The chamber 122 further includes a transparent cover 123 covering the chamber 122, so that the humidity sensing component 13 is surely placed in the chamber 122. Therefore, the humidity sensing component 13 can sense the degree of moisture absorption of the hygroscopic ingot body 11, and produce color changes according to the degree of moisture absorption. The user can judge whether the hygroscopic ingot body 11 needs to be dried and reduced by observing the color of the humidity sensing component 13 through the transparent cover 123.

In a preferred embodiment of the split reducible dehumidifier of the present invention, the hygroscopic ingot 1 further includes a lower base 14. The lower base 14 is a concave cavity structure and is combined at the lower end of the hygroscopic ingot body 11, that is, an approximately closed air chamber 143 is defined with the hygroscopic ingot body 11. The lower base 14 has an air inlet 141 disposed thereon, the air inlet 141 is communicated with the air chamber 143, and the air chamber 143 is communicated with the plurality of channels 111 of the hygroscopic ingot body 11. When it is necessary to dry and restore the hygroscopic ingot body 11, the hot air supply unit 2 can input a hot airflow from the air inlet 141, so that the hot airflow is allowed to enter and diffuse inside the air chamber 143, thereby allowing all parts of the overall cavity to obtain a balanced positive pressure. Therefore, the hot airflow can enter into the plurality of channels 111 of the hygroscopic ingot body 11 in equal pressure and equal amounts, and evenly dry and restore all corners of the hygroscopic ingot body 11.

The hot air supply unit 2 is located below the hygroscopic ingot 1. The hot airflow passing through the channels 111 of the hygroscopic ingot body 11 of the hygroscopic ingot 1 comes from the hot air supply unit 2. The hygroscopic ingot 1 and the hot air supply unit 2 are detachably and movably coupled to form a split reducible dehumidifier of the present invention. That is, the hygroscopic ingot 1 can be separated from the hot air supply unit 2, and is placed separately in the environment that needs to be dehumidified for dehumidification, when the hygroscopic ingot 1 adsorbs moisture saturation and loses the hygroscopic effect, and needs to be dried and reduced to restore the hygroscopic effect, the hygroscopic ingot 1 can be coupled to the hot air supply unit 2, and the hot airflow supplied by the hot air supply unit 2 through the air chamber 143 formed by the cavity in the lower base 14 first causes the hot airflow input through the air inlet 141 to diffuse inside the air chamber 143, and then allows each part in the integral cavity to obtain a balanced positive pressure, so that the hot airflow can be diverted to each channel 111 in the hygroscopic ingot body 11 at equal pressure and in the same amount, so as to further make each corner of the hygroscopic ingot body 11 obtain a uniform drying reduction effect. In particular, when the lower end of the hygroscopic ingot body 11 is combined with a lower base 14, and the hygroscopic ingot 1 is coupled with the hot air supply unit 2, the air outlet 21 of the hot air supply unit 2 will be correspondingly closely connected to the air inlet 141 of the lower base 14, so that the hot airflow is indeed sent into the plurality of channels 111 in a balanced manner.

In a preferred embodiment of a split reducible dehumidifier of the present invention, the hygroscopic ingot body 11 has at least two upper locking holes 112 provided at the upper end thereof. The upper base 12 has at least two upper perforations 124 arranged thereof corresponding to the upper locking holes 112 on the upper end of the hygroscopic ingot body 11. The locking members 15 pass through the upper perforations 124 of the upper base 12 and then is locked into the upper locking holes 112, so that the upper base 12 and the hygroscopic ingot body 11 are combined and fixed.

In a preferred embodiment of a split reducible dehumidifier of the present invention, the hygroscopic ingot body 11 has at least two lower locking holes 113 provided at the lower end thereof. The lower base 14 has at least two lower perforations 142 arranged thereof corresponding to the lower locking holes 113 on the lower end of the hygroscopic ingot body 11. The locking members 15 pass through the lower perforations 142 of the lower base 14 and then is locked into the lower locking holes 113, so that the lower base 14 and the hygroscopic ingot body 11 are combined and fixed.

In a preferred embodiment of a split reducible dehumidifier of the present invention, the main component of the hygroscopic ingot body 11 is a porous hygroscopic material that is formed into an ingot-shaped structure with moisture absorption capacity by mold pressing. A shell-less dehumidifier that does not require a shell to house hygroscopic material can be formed. However, a breathable fabric material with good aesthetics and texture can also be coated on the surface of the ingot-shaped structure to enhance the appearance and quality of the dehumidifier.

What is claimed is:

1. A split reducible dehumidifier, comprising a hygroscopic ingot and a separable hot air supply unit arranged thereon respectively, wherein the hygroscopic ingot comprises a hygroscopic ingot body, which is an ingot-shaped structure made of porous hygroscopic materials, thus forming the hygroscopic ingot that does not require a shell to accommodate hygroscopic materials, wherein the hygroscopic ingot body has a plurality of channels distributed inside the hygroscopic ingot body that are formed integrally by the porous hygroscopic material, to form multiple ventilation paths without air ducts, wherein the hot air supply unit has an air outlet disposed thereon and corresponds to the channels of the hygroscopic ingot, wherein the hygroscopic ingot is correspondingly and selectively installed at the air outlet of the hot air supply unit in a detachable movable coupling manner, and wherein when the hot air supply unit is operational for regeneration of the hygroscopic ingot, a hot airflow generated by the hot air supply unit enters the channels of the hygroscopic ingot body through the air outlet.

2. The split reducible dehumidifier as claimed in claim 1, wherein the hygroscopic ingot body has a rough surface that is capable of increasing the hygroscopic surface area.

3. The split reducible dehumidifier as claimed in claim 2, wherein the hygroscopic ingot comprises an upper base combined with an upper end of the hygroscopic ingot body, wherein the upper base has at least one exhaust hole arranged thereon.

4. The split reducible dehumidifier as claimed in claim 3, wherein the hygroscopic ingot comprises a humidity sensing component arranged on the upper base.

5. The split reducible dehumidifier as claimed in claim 4, wherein the humidity sensing component is a moisture-absorbing color-changing component.

6. The split reducible dehumidifier as claimed in claim 5, wherein the hygroscopic ingot comprises a lower base combined with a lower end of the hygroscopic ingot body, wherein the lower base has at least one air inlet arranged thereon.

7. The split reducible dehumidifier as claimed in claim 1, wherein the hygroscopic ingot comprises an upper base combined with an upper end of the hygroscopic ingot body, wherein the upper base has at least one exhaust hole arranged thereon.

8. The split reducible dehumidifier as claimed in claim 7, wherein the hygroscopic ingot comprises a humidity sensing component arranged on the upper base.

9. The split reducible dehumidifier as claimed in claim 8, wherein the humidity sensing component is a moisture-absorbing color-changing component.

10. The split reducible dehumidifier as claimed in claim 9, wherein the hygroscopic ingot comprises a lower base combined with a lower end of the hygroscopic ingot body, wherein the lower base has at least one air inlet arranged thereon.

11. The split reducible dehumidifier as claimed in claim 2, wherein the hygroscopic ingot comprises a lower base combined with a lower end of the hygroscopic ingot body, wherein the lower base has at least one air inlet arranged thereon, wherein the lower base has an air chamber formed by a concave cavity structure, and the air chamber is communicated with the air inlet.

12. The split reducible dehumidifier as claimed in claim 1, wherein the hygroscopic ingot comprises a lower base combined with a lower end of the hygroscopic ingot body, wherein the lower base has at least one air inlet arranged thereon, wherein the lower base has an air chamber formed by a concave cavity structure, and the air chamber is communicated with the air inlet.

13. The split reducible dehumidifier as claimed in claim 2, wherein the hygroscopic ingot comprises a lower base combined with a lower end of the hygroscopic ingot body, wherein the lower base has an air chamber formed by a concave cavity structure.

14. The split reducible dehumidifier as claimed in claim 1, wherein the hygroscopic ingot comprises a lower base combined with a lower end of the hygroscopic ingot body, wherein the lower base has an air chamber formed by a concave cavity structure.

15. The split reducible dehumidifier as claimed in claim 1, wherein the hygroscopic ingot body is capable of being covered with a breathable fabric material.

* * * * *